United States Patent [19]
Schütt et al.

[11] Patent Number: 5,611,635
[45] Date of Patent: Mar. 18, 1997

[54] BALL JOINT

[75] Inventors: Hans-Joachim Schütt, Berheim; Lothar Broszat, Monheim; Theo Heep, Krefeld; Wolfgang Prickler, Kaarst, all of Germany

[73] Assignee: TRW Fahrwerksysteme GmbH & Co. KG, Dusseldorf, Germany

[21] Appl. No.: 529,142

[22] Filed: Sep. 15, 1995

[30] Foreign Application Priority Data

Sep. 22, 1994 [DE] Germany .................... 44 33 762.0

[51] Int. Cl.⁶ ...................................... F16C 11/06
[52] U.S. Cl. .................... 403/141; 403/122; 403/130; 403/135; 403/270
[58] Field of Search ........................ 403/270, 133, 403/135, 141, 142, 132, 130, 127, 128, 122

[56] References Cited

U.S. PATENT DOCUMENTS

| | | | |
|---|---|---|---|
| 4,679,958 | 7/1987 | Mizusawa et al. | 403/141 X |
| 4,904,107 | 2/1990 | Fukukawa et al. | 403/135 X |
| 5,044,811 | 9/1991 | Suzuki et al. | 403/133 X |
| 5,152,628 | 10/1992 | Broszat et al. | 403/135 X |

*Primary Examiner*—Anthony Knight
*Attorney, Agent, or Firm*—Tarolli, Sundheim, Covell, Tummino & Szabo

[57] ABSTRACT

The invention pertains to a ball joint comprising a housing (1) provided with a cylindrical receptacle opening (1a) and a gudgeon (2) arranged in a ball socket (3) made of plastic such that it is able to rotate and pivot within a limited range, wherein the outer surface (3b) of the ball socket that corresponds with the inner diameter of the receptacle opening (1a) is, after the assembly process, fixed in the radial direction and secured in the axial direction by means of annular shoulders (3c,4a), one of which (3c) is situated on an annular flange that surrounds the opening (3a) of the ball socket (3) on the side of the gudgeon. In order to ensure a secure, i.e., large-surface, fixing of the ball socket (3) on the housing (1) in the axial direction despite a simplified manufacture, the annular shoulder (4a) that cooperates with the upper side of the housing (1) is arranged on a ring (4) connected with the ball socket (3), preferably in an inseparable manner by means of ultrasonic welding.

12 Claims, 2 Drawing Sheets

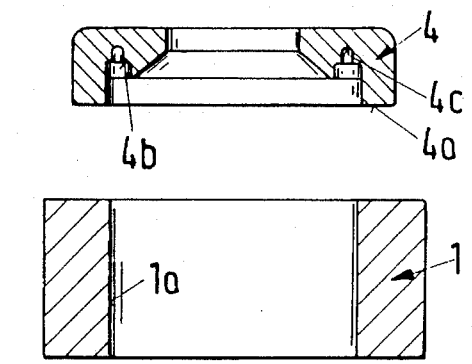
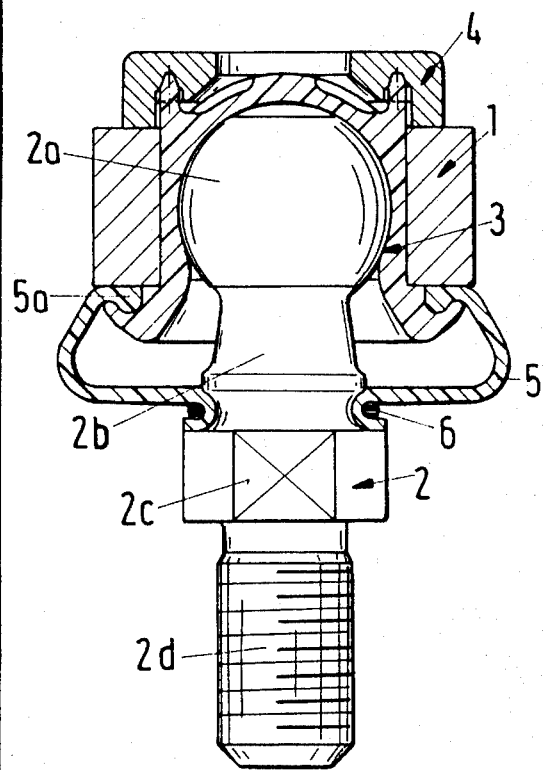
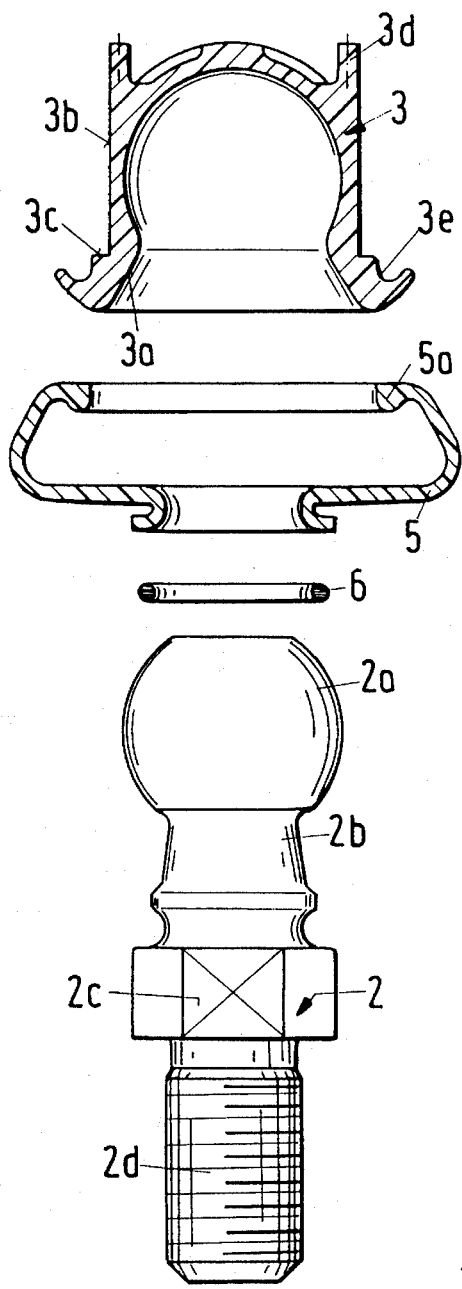

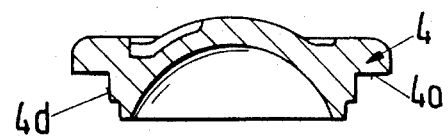
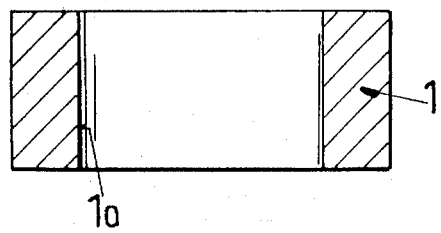
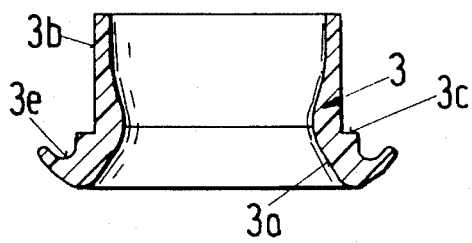
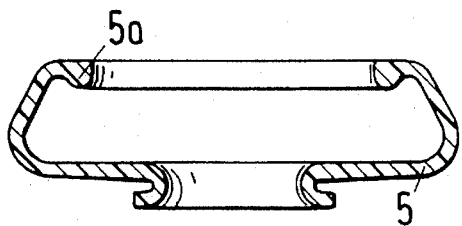
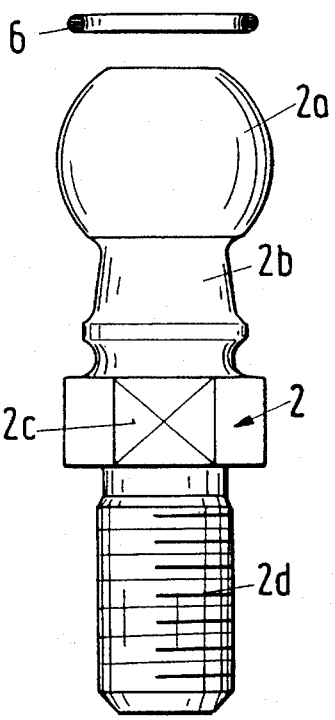
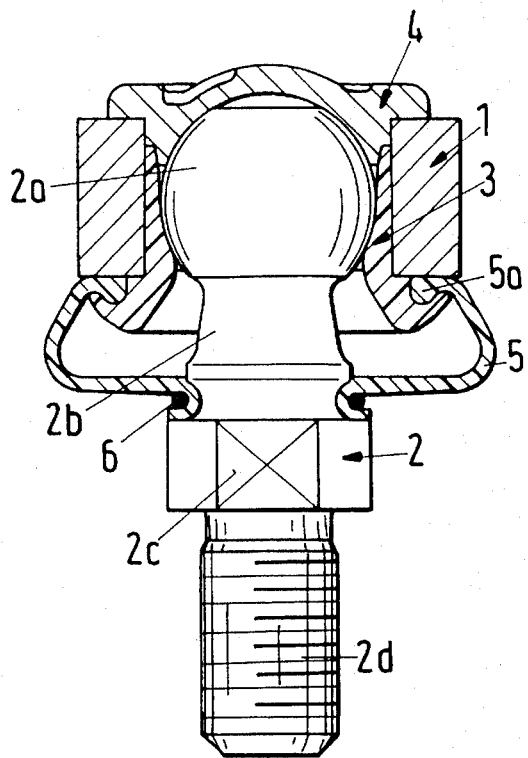

BALL JOINT

The invention pertains to a ball joint comprising a housing provided with a cylindrical receptacle opening and a gudgeon that is arranged in a ball socket of plastic such that it is able to rotate and pivot within a limited range, wherein the outer surface of said ball socket that corresponds with the inner diameter of the receptacle opening is, after the assembly process, fixed in the radial direction and secured in the axial direction by means of annular shoulders, one of which is situated on an annular flange that surrounds the opening of the ball socket on the side of the gudgeon.

Ball joints of the aforementioned type are, for example, known from German Patent Nos. 3,843,331 C2 and 3,905,474 C2. In one known variation, the ball socket manufactured of plastic is provided with a border that protrudes from the cylindrical receptacle opening of the housing on the side situated opposite to the annular shoulder. This protruding border is flanged so as to axially fix the ball socket on the housing. This deformation process requires that the plastic material is heated. In this case, it is very important with respect to the durability of the ball joint that the temperature required for heating the plastic material is precisely observed. If the temperature is too low, it is possible that the deformation of the flanged border does not suffice for adequately securing the ball socket on the housing. If the temperature is too high, it is possible that the material is excessively softened, e.g., due to localized melting; this can have disadvantageous effects on the material properties of the finished ball joint. In this case, the required safety with respect to the fixing of the ball socket in the housing cannot be guaranteed.

In the second known embodiment, an annular shoulder that can be elastically deformed and that axially secures the position of the ball socket on the housing is provided. However, this embodiment is associated with the disadvantage that not only is a high expenditure of force in the axial direction of the gudgeon required during the assembly of the ball joint, but that the housing as well as the ball socket needs to be manufactured with the highest possible precision so as to ensure the reliable seat of the ball socket in the cylindrical receptacle opening of the housing and prevent the ball socket from having an axial play inside of the housing due to certain tolerances.

Originating from this known state of the art, the present invention is based on the objective of disclosing a ball Joint of the initially mentioned type that can be manufactured in a simple manner, but also guarantees that the ball socket is securely, i.e., over a large surface, fixed in the cylindrical receptacle opening of the housing, namely also in the axial direction.

According to the invention, this objective is attained due to the fact that the annular shoulder that cooperates with the upper side of the housing is arranged on a ring connected with the ball socket.

The utilization of this ring, which is also manufactured of plastic, results in an annular shoulder that has a wide radial extent and forms a large support surface after being connected with the ball socket such that a high safety of the assembled ball joint is guaranteed. Tolerances and dimensional errors in the axial height of the housing as well as the ball socket are simultaneously compensated such that the requirements regarding the manufacturing accuracy of both components can be reduced and a more cost-efficient production is attained.

According to one additional characteristic of the invention, the ring is inseparably connected with the ball socket. According to the invention, this is realized by welding, preferably in the form of an ultrasonic welding process. Consequently, one attains not only a reliable welding connection, but also a welding connection that precludes damage to the plastic material.

In one preferred embodiment of the invention, the ball socket or the ring is realized with an axially projecting, annular extension, with the other component being provided with a corresponding receptacle groove. Due to this design, one attains concrete volumes for carrying out the welding process that lie outside of the cross sections of the ball socket subjected to the bearing forces, such that negative effects on the durability of the ball socket are precluded. In order to attain a safe manufacture of the positive connection despite possibly existing manufacturing tolerances, one additional characteristic of the invention proposes to arrange a smaller supplementary groove that is able to accommodate possibly existing excess material during the welding process in the base of the receptacle groove.

According to one preferred embodiment of the invention, the ball socket is closed on the side situated opposite to the opening on the side of the gudgeon, with the ball socket protruding from the upper side of the housing. Independently of the attachment of the ring according to the invention, this measure provides a closed bearing surface.

According to one alternative embodiment of the invention, the ball socket is open on the side situated opposite to the opening on the side of the gudgeon; in this case, this side of the ball socket lies inside of the housing and said ball socket is closed by means of a ring that is realized as a bearing cover. Consequently, the arrangement of the ball in this embodiment is closed on the side situated opposite to the opening on the side of the gudgeon.

In order to guide not only the ball socket, but also the bearing cover in the radial direction inside of the receptacle opening of the housing, the invention proposes that the ring that is realized as a bearing cover has a cylindrical outer surface that corresponds with the inner diameter of the receptacle opening of the housing.

Two embodiments of the ball joint according to the invention are illustrated in the figures. The figures show:

FIG. 1, a longitudinal section through a first embodiment of an assembled ball joint, FIG. 2, a longitudinal section through the individual components of the ball joint according to FIG. 1, FIG. 3, a longitudinal section through a second embodiment of an assembled ball joint, and FIG. 4, a longitudinal section through the individual components of the ball joint according to FIG. 3.

In both embodiments, the ball joint comprises a housing 1 provided with a cylindrical receptacle opening 1a and a gudgeon 2 arranged in a ball socket 3 made of plastic such that it can be turned and pivoted within a limited range.

The gudgeon 2 comprises a flattened ball 2a connected in one piece with a threaded pin 2d via a neck 2b provided with surfaces 2c for attaching a wrench over part of its length.

In the first embodiment according to FIGS. 1 and 2, the ball socket 3 that is manufactured of plastic is closed except for its opening 3a on the side of the gudgeon. This ball socket has a cylindrical outer surface 3b that corresponds with the inner diameter of the receptacle opening 1a of the housing 1. This cylindrical outer surface transforms into an annular shoulder 3c within the region of the opening 3a on the side of the gudgeon. In the assembled condition, the annular shoulder of the ball socket 3 adjoins the underside of the housing 1 as shown in FIG. 1. At its end that is situated opposite to this annular shoulder 3c, the outer surface 3b transforms into an annular extension 3d that, according to FIG. 1, protrudes from the receptacle opening 1a of the housing 1 in the assembled condition. A ring 4 having an annular shoulder 4a that cooperates with the upper side of the housing 1 as well as an annular receptacle groove 4b that corresponds with the extension 3d of the ball socket 3 is attached onto this extension 3d.

Within the region of the extension 3d of the ball socket 3, which protrudes into the receptacle groove 4b of the ring 4, these two components are inseparably welded together, preferably by means of ultrasonic welding. This results in a reliable connection between these two components outside of the cross section used for the arrangement of the ball 2a and securing the position of the ball socket 3 in the housing 1. FIGS. 1 and 2 also show that the ball socket 3 is axially secured with respect to its position in the housing 1 due to a wide annular surface of the ring 4 such that a reliable retention of the ball socket 3 in the housing 1 is attained.

The upper portion of FIG. 2 shows that a smaller supplementary groove 4c is arranged in the base of the receptacle groove 4b. This supplementary groove is provided in order to accommodate excess material during the welding process, i.e., the individual components are reliably and precisely secured in the axial direction despite larger tolerances and possibly existing dimensional errors.

In the second embodiment according to FIGS. 3 and 4, the ball socket 3 is open on the side situated opposite to the opening 3a on the side of the gudgeon. This provides the advantage that the ball 2a of the gudgeon 2 can be inserted from this side without having to widen the ball socket 3. FIG. 3 shows that the open side of the ball socket 3 lies inside of the housing 1, with the ball socket being closed by means of a ring 4 that is simultaneously realized as a bearing cover. Adjacent to its annular surface 4a according to the upper portion of FIG. 4, the ring 4 has a cylindrical outer surface 4d that corresponds with the inner diameter of the receptacle opening 1a of the housing 1, i.e., the ring 4 that is realized as a bearing cover is also exactly guided inside of the receptacle opening 1a of the housing 1 in the radial direction.

In the second embodiment, the positive connection between the ring 4 that is realized in the form of a bearing cover and the upper end of the ball socket 3 is also realized by welding, preferably an ultrasonic welding process. In this embodiment, the weld also lies outside of the parts of the ball socket 3 and the ring 4 used for arranging the ball 2a and axially securing the position of the ball socket 3 in the housing 1.

In both embodiments, a sealing bellows 5 is provided so as to protect the opening 3a of the ball socket 3 situated on the side of the gudgeon from the admission of dirt. This sealing bellows 5 is fixed on the opening situated on the side of the gudgeon by means of a clamping ring 6 attached onto the neck 2b of the gudgeon 2. At the other end, the sealing bellows 5 is fixed in its position by means of a bead 5a inserted into a groove 3e of the ball socket 3 before the ball socket 3 is inserted into the receptacle opening 1a of the housing 1. In the inserted condition (see FIGS. 1 and 3), the bead 5a of the sealing bellows 5 is clamped between the ball socket 3 and the housing 1.

LIST OF REFERENCE NUMERALS

1 Housing
1a Receptacle opening
2 Gudgeon
2a Ball
2b Neck
2c Surface for attaching a wrench
2d Threaded pin
3 Ball socket
3a Opening on the side of the gudgeon
3b Outer surface
3c Annular shoulder
3d Extension
3e Groove
4 Ring
4a Annular shoulder
4b Receptacle groove
4c Supplementary groove
4d Outer surface
5 Sealing bellows
5a Bead
6 Clamping ring

We claim:

1. Ball joint comprising a housing (1) provided with a cylindrical receptacle opening (1a) and a gudgeon (2) arranged in a ball socket (3) made of plastic such that it is able to rotate and pivot within a limited range, wherein the outer surface (3b) of said ball socket that corresponds with the inner diameter of the receptacle opening (1a) is, after the assembly process, fixed in the radial direction and secured in the axial direction by means of annular shoulders (3c, 4a), one of which (3c) is situated on an annular flange that surrounds the opening (3a) of the ball socket (3) on the side of the gudgeon, characterized by the fact that the annular shoulder (4a) that cooperates with the upper side of the housing (1) is arranged on a ring (4) forming, before the assembly process, a separate member which is, after the assembly process, connected with the ball socket (3) forming a unit with said ball socket.

2. Ball joint according to claim 1, characterized by the fact that the ring (4) is inseparably connected with the ball socket (3).

3. Ball joint according to claim 2, characterized by the fact that the ring (4) is connected with the ball socket (3) by welding, preferably an ultrasonic welding process.

4. Ball joint according to claim 1 characterized by the fact that the ball socket (3) or the ring (4) is provided with an axially protruding, annular extension (3d), with the other component being provided with a corresponding receptacle groove (4b).

5. Ball joint according to claim 4, characterized by the fact that a smaller supplementary groove (4c) is arranged in the base of the receptacle groove (4b).

6. Ball joint according to claim 1 characterized by the fact that the ball socket (3) is closed on the side situated opposite to the opening (3a) on the side of the gudgeon, and that said ball socket protrudes from the upper side of the housing (1).

7. Ball joint according to claim 1 characterized by the fact that the ball socket (3) is open on its side that is situated opposite to the opening (3a) on the side of the gudgeon, that this side of the ball socket lies inside of the housing (1), and that the ball socket is closed by means of a ring (4) that is realized in the form of a bearing cover.

8. Ball joint according to claim 7, characterized by the fact that the ring (4) that is realized as a bearing cover has a cylindrical outer surface (4d) that corresponds with the inner diameter of the receptacle opening (1a) of the housing (1).

9. Ball joint comprising a housing (1) provided with a cylindrical receptacle opening (1a) and a gudgeon (2) arranged in a ball socket (3) made of plastic such that it is able to rotate and pivot within a limited range, wherein the outer surface (3*b*) of said ball socket that corresponds with the inner diameter of the receptacle opening (1*a*) is, after the assembly process, fixed in the radial direction and secured in the axial direction by means of annular shoulders (3*c*,4*a*), one of which (3*c*) is situated on an annular flange that surrounds the opening (3*a*) of the ball socket (3) on the side of the gudgeon, the annular shoulder (4*a*) that cooperates with the upper side of the housing (1) being arranged on a ring (4) connected with the ball socket (3), one of the ball socket (3) and the ring (4) being provided with an axially protruding, annular extension (3*d*), with another of the ball socket (3) and the ring (4) being provided with a corresponding receptacle groove (4*b*).

10. Ball joint according to claim 9, characterized by the fact that a smaller supplementary groove (4*c*) is arranged in the base of the receptacle groove (4*b*).

11. Ball joint comprising a housing (1) provided with a cylindrical receptacle opening (1*a*) and a gudgeon (2) arranged in a ball socket (3) made of plastic such that it is able to rotate and pivot within a limited range, wherein the outer surface (3*b*) of said ball socket that corresponds with the inner diameter of the receptacle opening (1*a*) is, after the assembly process, fixed in the radial direction and secured in the axial direction by means of annular shoulders (3*c*,4*a*), one of which (3*c*) is situated on an annular flange that surrounds the opening (3*a*) of the ball socket (3) on the side of the gudgeon, the annular shoulder (4*a*) that cooperates with the upper side of the housing (1) being arranged on a ring (4) connected with the ball socket (3), the ball socket (3) being open on its side that is situated opposite to the opening (3*a*) on the side of the gudgeon, this side of the ball socket lying inside of the housing (1), and the ball socket being closed by means of a ring (4) that is realized in the form of a bearing cover.

12. Ball joint according to claim 11, characterized by the fact that the ring (4) that is realized as a bearing cover has a cylindrical outer surface (4*d*) that corresponds with the inner diameter of the receptacle opening (1*a*) of the housing (1).

* * * * *